United States Patent [19]
Yang

[11] Patent Number: 4,779,863
[45] Date of Patent: Oct. 25, 1988

[54] RUNNING EXERCISE BICYCLE

[76] Inventor: Kuey M. Yang, Fifth Floor, No. 201, Section 3, Nanking E. Road, Taipei, Taiwan

[21] Appl. No.: 66,518

[22] Filed: Jun. 26, 1987

[51] Int. Cl.$^4$ .......................... A63B 25/08; B62M 1/00
[52] U.S. Cl. .......................................... 272/114; 272/73; 280/221; 280/258
[58] Field of Search ..................... 272/73, 114, 93, 70, 272/70.3; 280/11, 115, 221, 252, 253, 258, 270

[56] References Cited

U.S. PATENT DOCUMENTS

| | | | |
|---|---|---|---|
| 1,434,105 | 10/1922 | Douthitt | 280/270 |
| 1,509,898 | 9/1924 | McConnell | 280/258 |
| 1,632,308 | 6/1927 | Mourer | 280/221 |
| 2,251,005 | 7/1941 | Rubinich | 280/258 |
| 3,415,540 | 12/1968 | Portnoff | 280/221 |

*Primary Examiner*—Richard J. Apley
*Assistant Examiner*—S. R. Crow
*Attorney, Agent, or Firm*—Angelo Notaro

[57] ABSTRACT

A running exercise bicycle is ridden by a user who alternately pedals two pedals to drive two rotary wheels into unidirectional rotation via two sets of individual mechanical drive devices to make the exercise bicycle move forward in a zigzag or straight path. A clutch device can inter-connect the wheels for co-rotation so that the bicycle can be driven on a straight path.

5 Claims, 6 Drawing Sheets

RUNNING EXERCISE BICYCLE

BACKGROUND OF THE INVENTION

The present invention relates to a sport instrument in the form of an exercise bicycle on which a user pedals to advance the exercise bicycle in a zigzag or straight path.

Based on statistics, about 20-30% of the people who are overweight or obese, or who feel obese, use treatments for losing weight. The usual methods cover dieting, low-calorie food intake, physical exercise and the Chinese traditional accupunctural weight-reducing methods. Of these, the most effective method, without any ill effects on the mental and physical health of the person using the treatment, is proper and constant physical exercise.

At present, since indoor sports equipment, which is used widely by people wishing to loose weight (and others), and for promoting health and amusement is not limited by time or space, such sports equipment is easily acceptable and therefore possesses excellent market acceptability and great further marketing development potential.

Previously, the designs for various sports equipment were available. One kind of equipment is fixed and is meant only for indoor uses. This kind of sports equipment is not subjected to limits of location and often needs only a small space for use. To the user, however, this kind of sports equipment merely takes the user's two feet and/or hands to conduct the simple mechanical actions, so the user must face monotonous and poor indoor environment and color tones, and even poorly circulated indoor air, and hence, the exercises themselves lack interest.

The user's will may even be subdued to the monotonous and simple mechanical motions which will easily make the user feel tired and weary, thereby reducing effects of the physical exercise which are meant to beef up their health.

The exercise bicycle disclosed in the U.S. Pat. No. 4,141,630, granted Feb. 27, 1979, to Emmons, is designed to improve the defects of excessive simplicity and mechanization of conventional indoor sports equipment. The exercise bicycle disclosed by Emmons has a speed identical to that of the user's pedaling, and a projector projects motion pictures of scenery in front of the user. Although said exercise bicycle, with said projector, can improve the defects of the simple and poor indoor environment, this may also increase the user's load when he pedals it in the poor circulation of the indoor air. The reality and changeability of the projected motion picture will also never compete with those of outdoor natural sights. Therefore, the projected motion picture cannot replace some features and merits of outdoor sports equipment.

The U.S. Pat. No. 84,163, granted Nov. 17, 1868, to Blake, discloses a velocipede comprised of a driving mechanism having rope reels, ratchet-wheels, and ropes which are pulled by a user and act upon said driving mechanism to move the rear wheels of the velocipede.

U.S. Pat. No. 233,691, granted Oct. 26, 1880, to Plomer, shows a velocipede having a steering mechanism in which pedal-like means are connected to a wheel spindle and a roller lies within the accurate slot of a control plate so as to rotate along a curve. A rider works a double-cranked axle with his feet to move the wheels of the velocipede.

U.S. Pat. No. 4,151,892, granted May 1, 1979, to Francken, shows a vehicle adapted for supporting a standing rider, wherein drive means are coupled to a first wheel and are operable by the hands of the standing rider by means of a cable. The control means comprises a pedal connected to a pair of wheels which controls the direction of said vehicle.

Among references which may be considered in conjunction with this application are the following U.S. Pat. Nos. 193,919; 247,156; 1,620,926; 1,777,237; 3,810 658; 4,189,166 and 4,515,362.

SUMMARY OF THE INVENTION

Although the aforesaid various sports equipment could reach some specific functions and objects of the invention, the present invention provides all the following features:

(a) It allows a standing and running user, whose alternate treading actions by his feet, make the wheels rotate via a drive mechanism; (b) the user's alternate treading actions by his feet can make the bicycle advance in a zigzag or straight path without a special control or turning device; (c) the inventive equipment functions like a treadmill, like a twist disc health builder and like a balance platform, i.e., to a standing user, at the same time, he must maintain a proper balance simultaneously during his running actions when he alternately treads, in order to keep the bicycle effectively advancing; and (d) since it is additionally provided with a turning control device and brake device, it can serve as a common bicycle for traveling.

The first object of this invention is to provide an exercise bicycle that a standing user's pedaling and running actions can make to advance in a zigzag or straight path; at the same time, when said bicycle reaches the health-building functions through physical exercise, it can also obtain the functions of amusement and balancing training.

Another object of the present invention is to provide the above-said type of exercise bicycle for health-building purposes through physical exercise and also for serving as a common bicycle in daily travels since it includes a turning control device and brake device.

A further object of the present invention is to provide the above-said type of exercise bicycle with advantages like simplicity, economic low cost, small-size and structure, and also availability for use at any time and place.

The exercise bicycle, to satisfy the above-cited and other objects, includes the following components:

A body frame with all the following-described members installed on said body frame; two rotary wheels, a clutch device installed between the ends of shafts of the two rotary wheels to make the actions of the two shafts alternating rotating and co-rotating during engagement or disengagement of the clutch device, said two rotary wheels being respectively installed on two sides and in the front of said body frame; one (or two) auxiliary wheel is (are) installed on the tail of said body frame; a first pedal and a second pedal are installed on the upper side of said body frame for a standing user to alternately pedal or tread said pedals with his feet, two sets of drive devices which can respectively transmit the driving forces produced when the pedals are pedaled by the user to the related rotary wheel, to make said two rotary wheels alternately and undirectionally rotate; a turning control device which can directly control the auxiliary wheel to turn it to an angle, thereby making said exercise bicycle turn, or, which makes said auxiliary wheel not controlled and therefore turn freely, and a brake device.

BRIEF DESCRIPTION OF THE DRAWINGS

All those who have familiarized themselves with this art can, according to the following descriptions and accompanying drawings, obtain a clearer understanding about the above-said objects, features and merits of the present invention.

DETAILED DESCRIPTION

Figure 1:
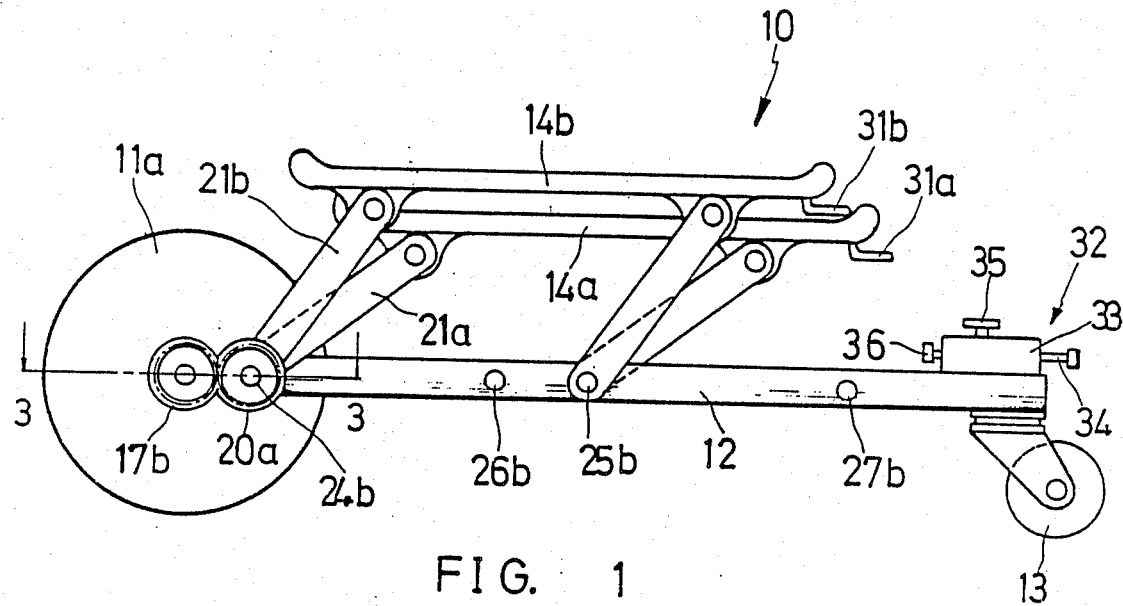
FIG. 1 is a side view of the exercise bicycle according to the present invention, showing the body frame, pedals, rotary wheels and mechanical drive device with one wheel omitted in said drawing for the convenience of display.
Figure 2:
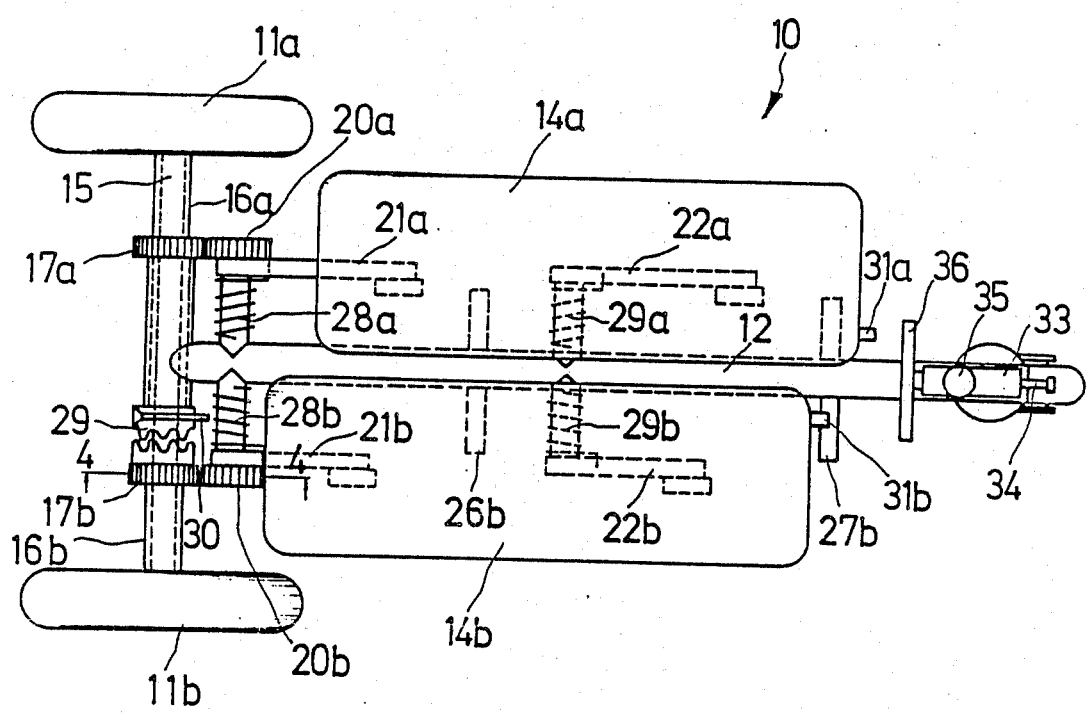
FIG. 2 is a top view of the exercise bicycle according to the present invention.

Referring to FIGS. 1 and 2, the embodiment 10 of the running exercise bicycle is without a turning control device or a brake device. According to the present invention, this exercise bicycle comprises: a body frame backbone 12 with all the following main members installed on said body frame backbone 12: two individually and separately rotatable and also co-axially rotatable rotary wheels, that is, a first rotary wheel 11a and a second rotary wheel 11b, which are separately installed on both sides on the front of afore-cited body frame backbone 12, one (or two) auxiliary wheel 13 for balance which is installed on the tail of said backbone 12, a first pedal 14a, and a second pedal 14b.

Figure 3:
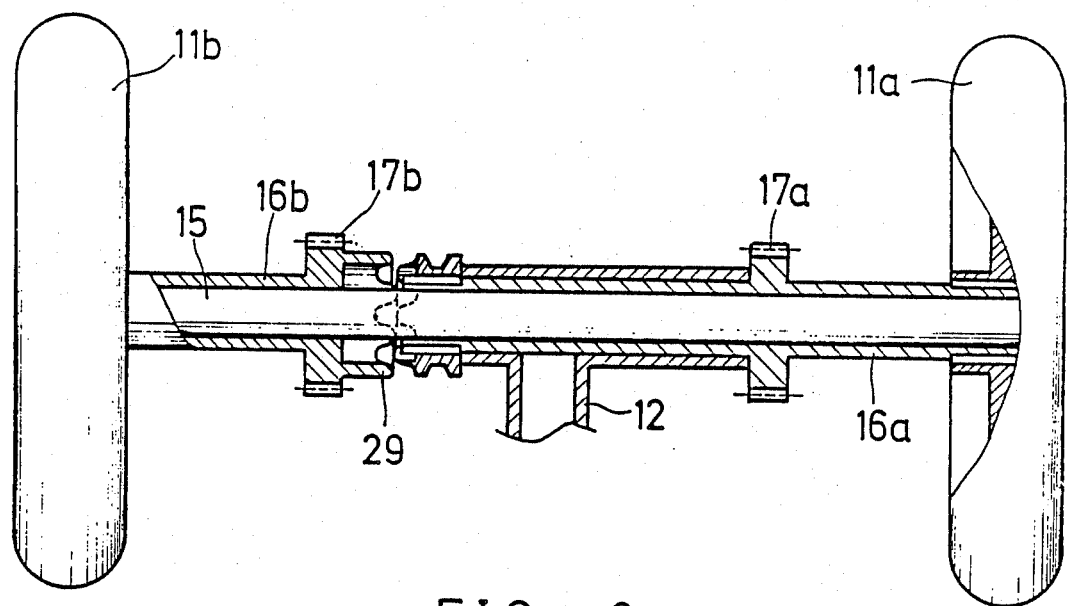
FIG. 3 is a partial cross sectional view along the line 3—3 of FIG. 1, showing two rotary wheels, shafts of said rotary wheels, and a clutch device.
Figure 4:
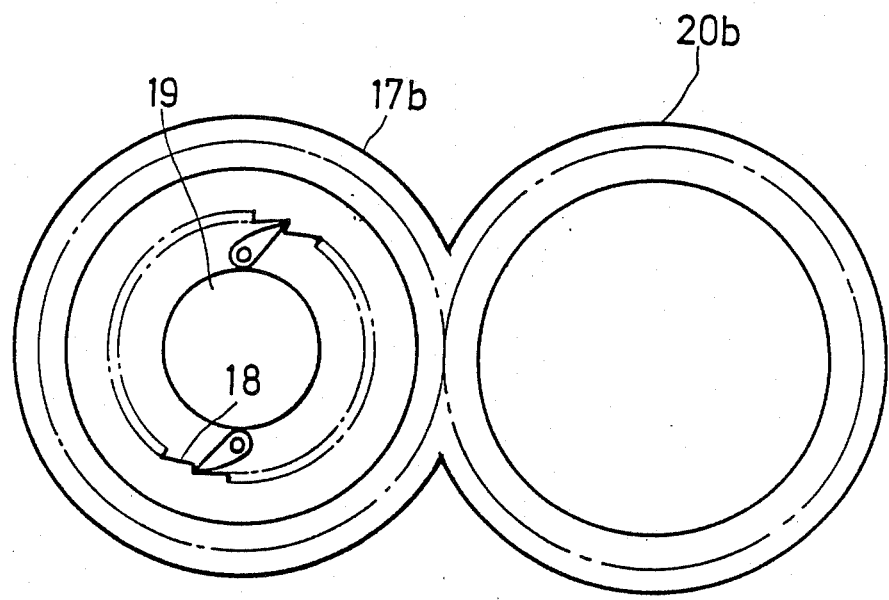
FIG. 4 is an enlarged cross sectional view along the line 4—4, of FIG. 2, showing the two mutually engaged gears in the drive device, one of said two gears being provided with an inner ratchet.

FIG. 3 shows a mandrel 15 extending between and also going through between said first and second rotary wheels 11a, 11b. The two rotary wheels 11a, 11b are separate and are each individually connected to telescopic sleeves 16a, 16b, respectively. A first gear 17a is provided on the end of said telescopic sleeve 16b. As shown in FIG. 4, a ratchet wheel 18 is provided inside said gear 17b and a ratchet wheel shaft 19 is connected to said telescopic sleeve 16b. Therefore, when the gear 17b rotates counterclockwise, said gear 17b can only drive said telescopic sleeve 16b into unidirectional motion, together with said second rotary wheels 11b. When said gear 17b rotates clockwise, said gear 17b will rotate idly and, therefore, said secod rotary wheel 11b will not move. This point will be detailed later. A fourth gear 20b is installed on the right side of said gear 17b, but as shown in FIG. 2, said fourth gear 20b is installed on a third link rod 21b, and in coordination, a fourth link rod 22b is pivoted on the second pedal 14b. When a user's left foot pedals down on the second pedal 14b, the third and fourth link rods 21b, 22b rotate clockwise with their respective pivotal pins 24b, 25b and stop when they touch stop pins 26b, 27b. During the process of the clockwise rotation of said second pedal 14b, the fourth gear 20b also rotates an angle accordingly to transmit rotation to the second gear 17b, (please see FIG. 4) while making said second rotary wheel 11b rotate forward a distance. When the user's left foot lifts off the pedal as shown in FIG. 2, the elastic force of torsion springs 28b, 29b makes said pedal 14b rise, and during the rising-up process of said pedal 14b, said second gear 17b rotates idly and thereby, said second rotary wheel 11b will not rotate in reverse.

As shown in FIG. 2, first pedal 14a is also provided with the same structure, namely first link rod 21a, second link rod 22a, and torsion springs 28a, 29a, and third gear 20a. Therefore, a user only needs to alternately pedal the first and second pedals 14a, 14b, which in turn will make said first and second rotary wheels 11a, 11b also alternately and intermittently rotate forward, thereby causing the zigzag traveling state. Further, as shown in FIG. 2, a clutch device 29 is provided on the spindle 15 of said two rotary wheels, and if and when a wrench is used to make said clutch close, first and second rotary wheels 11a, 11b will form synchronous link movements to make said exercise bicycle serve as one traveling forward in a straight line.

The members, such as the link rods installed between said pedals and rotary wheels, mutually engaged gear sets and the inner ratchet wheel joined with a gear as a single integral body, compose a mechanical drive device; the function of such a mechanical drive device will transmit the motive forces produced by the two pedals, when a standing user pedals said pedals to the two rotary wheels respectively, thereby making said two rotary wheels alternately and undirectionally rotate.

Figure 5:
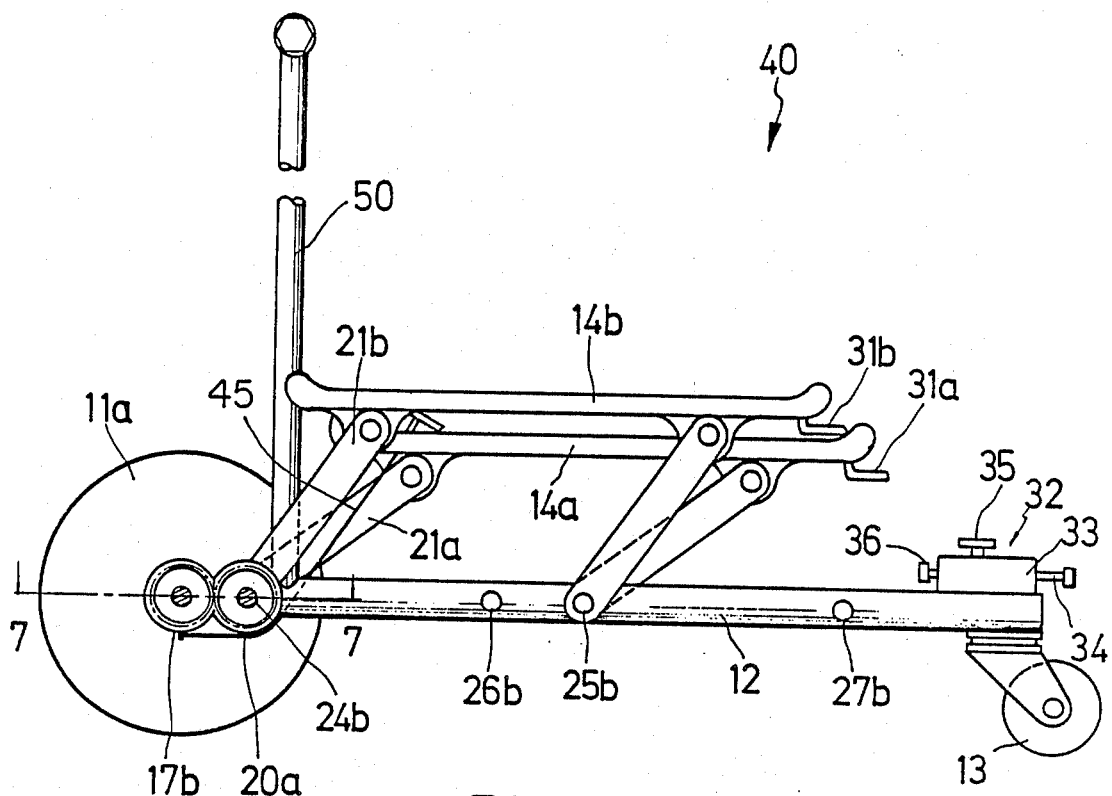
FIG. 5 is a side view of another embodiment of the exercise bicycle according to the present invention, said exercise bicycle having a turning control device and brake device.
Figure 6:
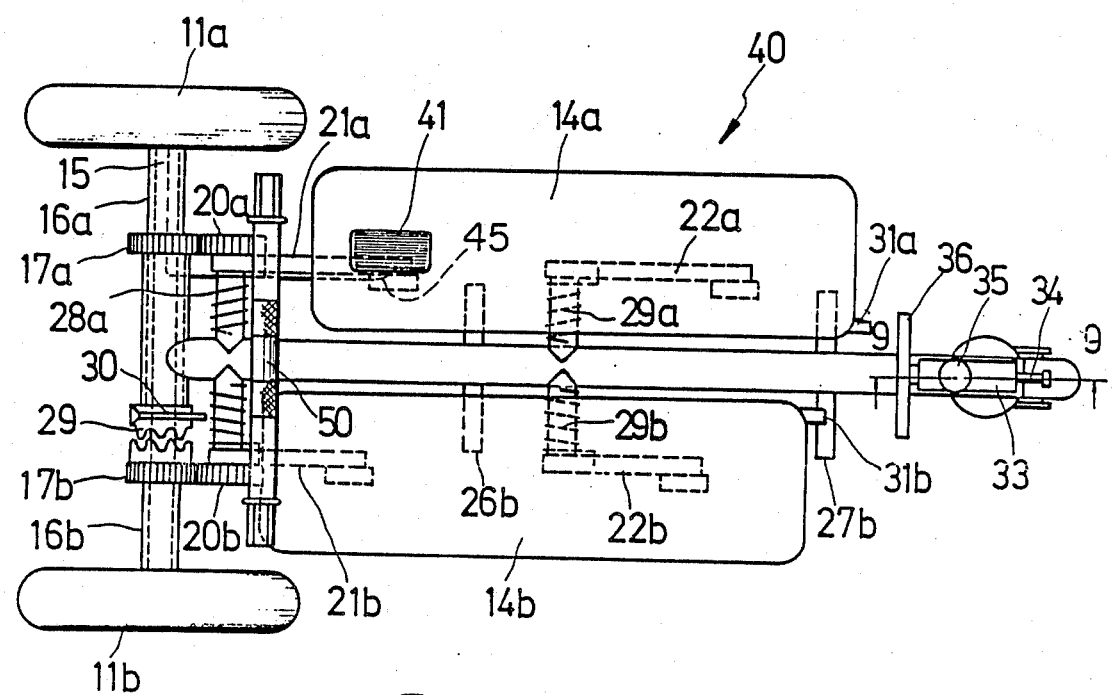
FIG. 6 is a top view of the embodiment of the exercise bicycle shown in FIG. 5.

FIGS. 5 and 6, show an embodiment 40 of the running exercise bicycle that has a turning control device and a brake device. The embodiment 40 of the running exercise bicycle has some of the same members as the embodiment of the running exercise bicycle shown in FIGS. 1 and 2, said same members being: two pedals, a body frame backbone, two rotary wheels, a clutch device and two sets of mechanical drive devices. Thus, just like the embodiment 10 of the running exercise bicycle, said embodiment 40 of the running exercise bicycle can, on account of the alternate treading and pedaling actions of a standing user's feet, make said two rotary wheels 11a, 11b alternately and unidirectionally rotate. When the clutch device 29 connects the motive forces of the shafts of the two rotary wheels to make the two rotary wheels 11a, 11b have a linked motion relationship, the running exercise bicycle 40 will run forward in a straight line. When the clutch device 29 makes the motive forces of the two rotary wheels separate to make the two rotary wheels 11a, 11b not have any linked motion relationship therebetween, the running exercise bicycle 40 will travel in a zigzag path. A turning control device and brake device are installed externally on embodiment 40 of the exercise bicycle to make the bicycle have the normal travel functions and also enhance its safety.

Figure 7:
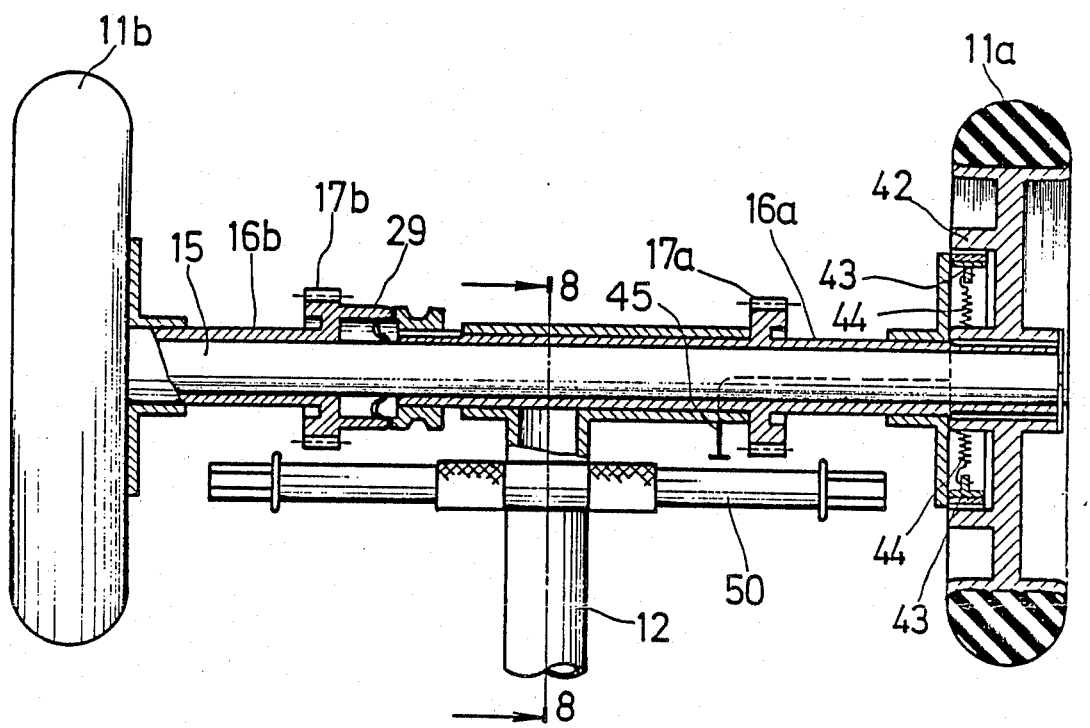
FIG. 7 is a partial cross sectional view along the line 7—7 of FIG. 5.

Please now see FIGS. 6 and 7, as well as FIG. 5. The brake device comprises: a brake pedal 41 provided on the right pedal 14a, a brake drum 43, provided on the hub 42 and brake lines 45 that connect the brake pedal 41 and brake drum 43. When a user presses the brake pedal 41, the brake lines will pull the brake drum 43 to make the brake drum 43 tightly press the hub 42 of rotary wheels 11a, 11b, thereby achieving the braking purpose. When the user releases the brake pedal 41, the brake drum 43 will be pulled back by the spring 44 to pull the brake drum 43 out of contact with the hub 42, so the two rotary wheels 11a, 11b when resume free rotation.

Figure 8:
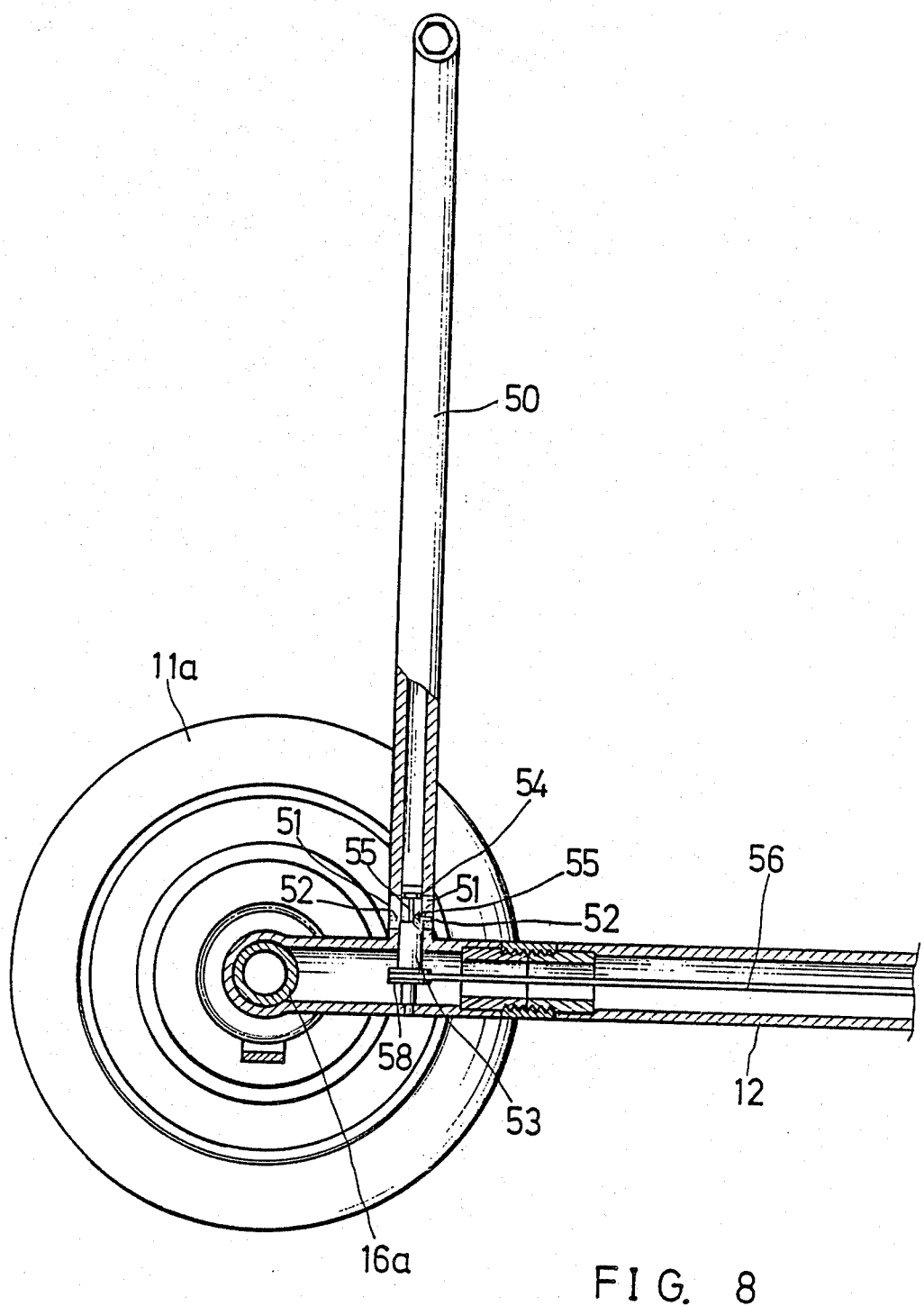
FIG. 8 is a partial cross sectional view along the line 8—8 of FIG. 7.
Figure 9:
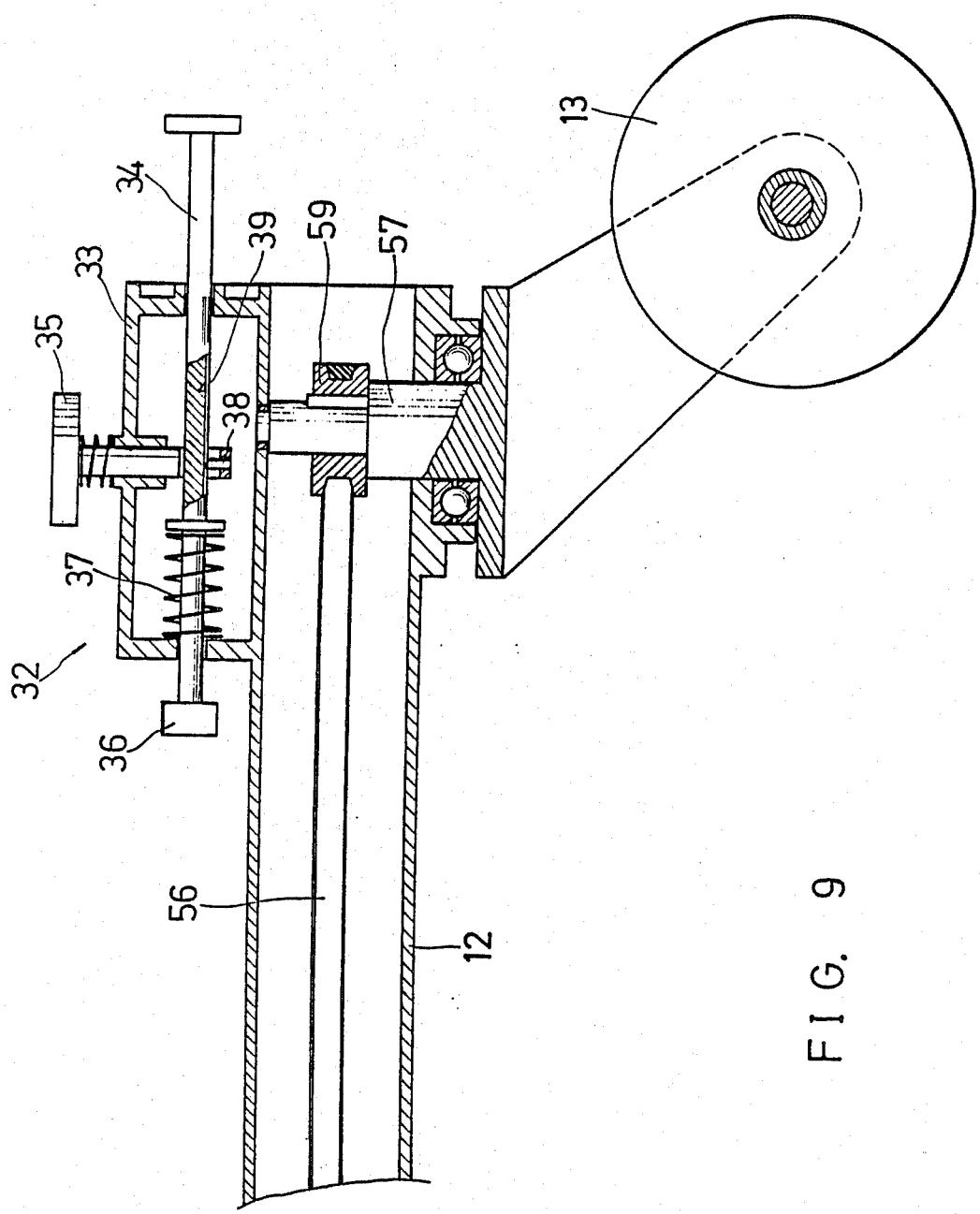
FIG. 9 is a partial cross sectional view along the line 9—9 of FIG. 6.

Please now see FIGS. 6, 8 and 9. The turning control device includes a control handle bar 50 that the user holds. Bar 50 is installed on the front of the body frame backbone 12 and has two protruding lugs 51 provided on its bottom to join a rotary shaft 53 by plug pins 52. The rotary shaft 53 is supported by a shaft in the body frame backbone 12 and has a radial annular slot 54 provided on its top, said radial annular slot 54 being in communication with two symmetrical axial slots 55. A leather belt 56 is meshed on a leather belt wheel 58 that is fixedly joined to said rotary shaft 53 and also on the leather belt wheel 59 that is fixedly joined to an auxiliary wheel shaft 57 carrying the auxiliary wheel 13.

When the user presses down on the control handle bar 50 to make the two plug pins 52 on the two protruding lugs 51, on the bottom of said handle bar move into the inner side of said two axial slots 55, the user can then rotate said control handle bar 50 to move belt 56 that makes said auxiliary wheel 13 rotate a corresponding angle, thereby achieving the purpose of steering the bicycle.

When the user lifts up on the control handle bar 50 to make the plug pins 52 enter the inner side of the radial annular slot 54, the control handle 50 can be turned to a horizontal state from any direction; which also frees the rotary shaft 53 and auxiliary wheel 13 from the control handle bar 50 and therefore they can turn to any direction freely.

Figure 10:
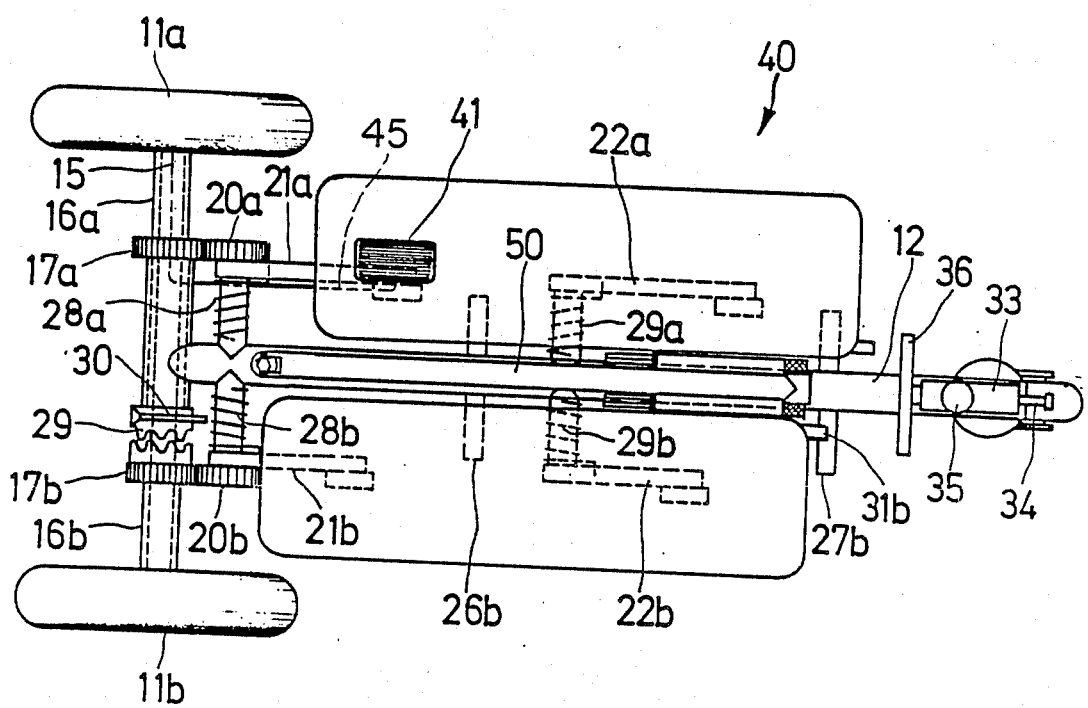
FIG. 10 is a top view when the control handle bar in the turning control device is folded under the respective pedals.

Please see FIG. 10. When a user wishes to make the running exercise bicycle 40 advance in a zigzag path without using the turning control device, the user may fold the control handle 50 horizontally over the upper part of the body frame backbone 12 without adversely affecting the movement ocli of the two pedals 14a, 14b, thereby allowing the user to smoothly pedal the two pedals 14a, 14b, to let the exercise bicycle 40 move forward.

As shown in FIGS. 1 and 9, fastening parts 31a, 31b are respectively provided on related ends of the two pedals 14a, 14b, and a fastening component 32 is provided on the body frame backbone 12 and comprises a fixing telescopic sleeve 33 and a push-and-snap-on rod 34 provided with a pedal knob 35 and a spring 37 provided on the inside of the fixing telescopic sleeve. A transverse push-and-snap-on-rod 36 is also provided on the push-and-snap-on rod 34. When the two pedals 14a, 14b are pressed down to the bottom by the user's two feet, the user can push the push-and-snap-on rod 34 to move the transverse rod 36 to the left to simultaneously fix the respective fastening parts 31a, 31b, on the two pedals 14a, 14b, thereby holding the two pedals 14a, 14b, down flat and therefore fixed to facilitate the convenient use of them the next time. In this position, one protruding button 38 on the pedal button 35 can just be inserted into a concave slot 39 on the push-and-snap-on rod 34, thereby making the push-and-snap-on rod 34 fixed thereon. During use, the user at first stands on the two pedals 14a, 14b, and with one of his feet steps on the pedaling button 35 to make the protruding button 38 move out of the concave slot 39, therefore, the push-and-snap-on rod 34 can, by the push force of spring 37, rapidly move to the right which, in turn, makes the transverse snap-on rod 36 immediately retract to the right and thus disengage from the fastening parts 31a, 31b, to get ready for movements.

Since this invention has features that are not known in the art; i.e., the alternately treading movements of a standing user's two feet make the exercise bicycle advance in a zigzag or straight path; consequently, this invention has health-building functions through physical exercise and also amusement interest and provision of balance training.

I claim:
1. A running exercise bicycle, comprising:
 a body frame;
 a first rotary wheel mounted on one side of the front of said body frame for rotation;
 a second rotary wheel mounted on the other side of the front of said body frame for rotation;
 a first pedal mounted on said body frame for pedaling and movement;
 a first link rod having one end connected to one end of said first pedal, said first link rod having another end pivoted on said body frame;
 a first unidirectional gear device connected between said first link rod and said first rotary wheel for unidirectional rotation of said first rotary wheel with movement of said first pedal;
 a second link rod having one end connected to the other end of first pedal, said second link rod having another end pivoted on said body frame;
 a second pedal mounted on said body frame for pedaling and movement;
 a third link rod having one end connected to one end of said second pedal, said third link rod having another end pivoted on said body frame;
 a second unidirectional gear device connected between said third link rod and said second rotary wheel for unidirectional rotation of said second rotary wheel with movement of said second pedal;
 a fourth link rod having one end connected on the other end of said second pedal, said fourth link rod having another end pivoted on said body frame;
 a free rotary auxiliary wheel mounted on the rear of said body frame, said auxiliary wheel being freely pivoted to said body frame for free swinging of the rear of said body frame with alternate unidirectional rotation of said first and second rotary wheels with alternate movement of said first and second pedals; and
 a clutch provided between said first rotary wheel said second rotary wheel for allowing independent unidirectional rotation of said rotary wheels, whereby said bicycle can be driven in a zigzag path, said clutch device being operable for interconnecting said first and second rotary wheels, whereby said bicycle can be driven in a straight path.
2. A running exercise bicycle according to claim 1, including a fastening part connected to said other end of each of said first and second pedals, spring means connected to each of said first and second pedals for lifting each of said first and second pedals upwardly from said body frame, a fastening component moveably mounted to said body frame for engagement with said fastening parts when said first and second pedals are in lowered positions adjacent said body frame for holding said pedals in said lowered position against the bias of said spring means, and release means connected to said fastening component for releasing said fastening component from engagement with said fastening parts to permit said pedals to rise under the bias of said spring means.

3. A running exercise bicycle according to claim 2, wherein said release means comprises a spring biasing said fastening component away from said fastening parts, a push-and-snap-on rod carrying said spring and said fastening component, and a pedal knob engagable with said push-and-snap-on rod for holding said puch-and snap-on rod to engage said fastening component with said fastening parts, and to release said push-and-snap-on rod for disengaging said fastening component from said fastening parts.

4. A running exercise bicycle, comprising:
a body frame;
a first rotary wheel mounted on one side of the front of said body frame for rotation;
a second rotary wheel mounted on the other side of the front of said body frame for rotation;
a first pedal mounted on said body frame for pedaling and movement;
a first link rod having one end connected to one end of said first pedal, said first link rod having another end pivoted on said body frame;
a first unidirectional gear device connected between said first link rod and said first rotary wheel for unidirectional rotation of said first rotary wheel with movement of said first pedal;
a second link rod having one end connected to the other end of first pedal, said second link rod having another end pivoted on said body frame;
a second pedal mounted on said body frame for pedaling and movement;
a third link rod having one end connected to one end of said second pedal, said third link rod having another end pivoted on said body frame;
a second unidirectional gear device connected between said third link rod and said second rotary wheel for unidirectional rotation of said second rotary wheel with movement of said second pedal;
a fourth link rod having one end connected on the other end of said second pedal, said fourth link rod having another end pivoted on said body frame;
a free rotary auxiliary wheel mounted on the rear of said body frame, said auxiliary wheel being freely pivoted to said body frame for free swinging of the rear of said body frame with alternate unidirectional rotation of said first and second rotary wheels; and
a turning control device connected to said free rotary auxiliary wheel for steering said free rotary auxiliary wheel, said turning control device comprising a rotary shaft rotatably mounted near the front of said body frame and including an annular slot and a pair of symmetrical axially extending slots communicating with said annular slot, a control handle having two protruding lugs provided near the bottom of said control handle, two plug pins respectively extending through said two protruding lugs and loosely engageable into said axially extending and annular slots, and transmission means operatively connected between said rotary shaft and said auxiliary wheel for steering said auxiliary wheel with rotation of said rotary shaft, whereby said control handle is rotatable for rotating said rotary shaft.

5. A running exercise bicycle according to claim 4, including a clutch device connected between said first and second rotary wheels for allowing independent unidirectional rotation of said rotary wheels, whereby said bicycle can be driven in a zigzag path, said clutch device being operable for interconnecting first and second said rotary wheels, whereby said bicycle can be driven in a straight path.

* * * * *